July 22, 1952  J. G. A. M. J. MEYER  2,603,971
DISTRIBUTOR FOR FLUID METERS
Filed July 20, 1945  3 Sheets-Sheet 1

Inventor
J. G. A. M. J. MEYER

July 22, 1952  J. G. A. M. J. MEYER  2,603,971
DISTRIBUTOR FOR FLUID METERS

Filed July 20, 1945  3 Sheets-Sheet 3

Inventor
J. G. A. M. J. MEYER

Patented July 22, 1952

2,603,971

UNITED STATES PATENT OFFICE 2,603,971

DISTRIBUTOR FOR FLUID METERS

Jean Gustave Antoine Marie Joseph Meyer, Neuilly sur Seine, France, assignor to Societe Anonyme pour tous Appareillages Mecaniques, La Courneuve, France Application July 20, 1945, Serial No. 606,107
In Belgium February 29, 1944

Section 1, Public Law 690, August 8, 1946
Patent expires February 29, 1964

1 Claim. (Cl. 73—221)

Double-gauge distributors, that is to say those comprising two gaugers one of which fills up with the liquid to be gauged, while the other empties in the receptacle or tank which is to be supplied, are not of very great accuracy when they operate continuously, because it is not practically admissible to wait, between the end of the emptying of one gauger and its subsequent filling up, a sufficiently long time for the draining of said gauger to be completely effected.

The draining of a gauger is, independently of other factors, a function of the viscosity of the liquid used. Now, if the lack of accuracy mentioned above already necessitates certain precautions with a double-gauger operating with petrol, for double-gaugers operating with more viscous liquids, such as gas-oil, it is necessary to appreciably reduce the speed of outflow.

A first improvement can be obtained by arranging an intermediate chamber which allows of increasing the emptying speed of the gauger, and, consequently, of having, for one and the same pumping speed, a longer time available for draining.

This arrangement, applied to 5 litres double-gaugers, gives results which are already at the limit of actual practical requirements since such arrangement renders it compulsory, however, to tolerate a primitive calibration of the gaugers greater than its theoretical value. Assuming that the average outflow is $n$ times each gauger, that the gauger has a theoretical capacity $C$ and that the draining corresponds to a volume $\epsilon$; let us calculate the capacity $C+c$ that ought to be given to the gauger for the outflow to be equal to $C$; each outflow will be equal to $C+c-\epsilon$, whereby the following equality may be written:

$$n(C+c-\epsilon)+\epsilon=nC$$

since the draining $\epsilon$ will only be collected once, when the gauger empties for the last time; this equality is simplified as follows:

$$nc=\epsilon(n-1)$$
$$c=\frac{\epsilon(n-1)}{n}$$

As explained, $c$ represents the additional capacity that should be given to a gauger of conventional type to compensate for the amount not drained out in each operation; and it has been explained that this additional capacity ought to be a function of $n$ number of outflows of the gauger for one operation; thus $c$ being variable, it is not possible with a gauge of the known type to make allowance for the amount not drained.

It will therefore be understood that $c$ is so much greater as $n$ is greater. It is thus that if use is made of 1 litre gaugers for one and the same volume supplied 5 times more drainings are lost than for a 5 litres gauger, the last draining not being taken into account.

It is thus that with a gas-oil pump the calibration can be of about 10% higher than its theoretical value. Moreover, as said draining is function of the viscosity of the liquid to be measured and, consequently, of the temperature, means are provided for compensating the variations of viscosity.

According to an embodiment of the invention, the distributor comprises a device collecting the draining from the gaugers, connected to a blow-off vat; the upper parts of the gaugers, of the blow-off chamber and of the intermediate chamber are united by a pipe-line in order to be subjected to the same pressure. On the other hand, according to a preferred embodiment of the invention, in combination with the usual intermediate chamber in which discharge the two gaugers, is provided a device intended to prevent the emptying of a gauger if, in the intermediate chamber there no longer remains a volume available at least equal to the volume of a gauger.

In this manner the emptying speed of the gaugers into the intermediate chamber is constant and independent of the manipulations which may be effected by the operator, being conditioned only by the sections of passage-way for the liquid and air. It will therefore be understood that the volume of liquid which is withdrawn from the distribution by the system collecting the draining during the emptying of the gauger which lasts a constant time, is itself constant. It can therefore be easily compensated by a corresponding calibration.

As regards the draining, it no longer forms part of the distribution since it is flowed in the blow-off vat by the system collecting the draining.

It will therefore be seen that, for a given viscosity of the liquid, a distributor has been obtained which gives, from this stand-point, the same accuracy for one gauger as for $n$ gaugers.

Finally, said device automatically compensates, and to a large extent, the differences of viscosity of the liquid to be distributed; in fact, if the volume of liquid to be drained effectively increases with the viscosity of the liquid, the volume which is withdrawn from the distribution during the emptying of the gauger, decreases when the viscosity increases, owing to the small relative dimension of the conduits which connect the gauger to the blow-off vat and which ensure a laminar flow; experience allows of adopting the dimensions of said conduits in order to obtain said compensation to the best advantage and to replace, if need be, a conduit the cross section of which is necessary for ensuring the flow of the draining, by a plurality of conduits the sum of the cross sections of which is the same as that of the preceding conduit and which therefore also allows said flow, but ensures said compensation with greater approximation.

Fig. 1 of the accompanying drawing very diagrammatically shows an apparatus operating in accordance with the principle of the invention.

Figure 1:
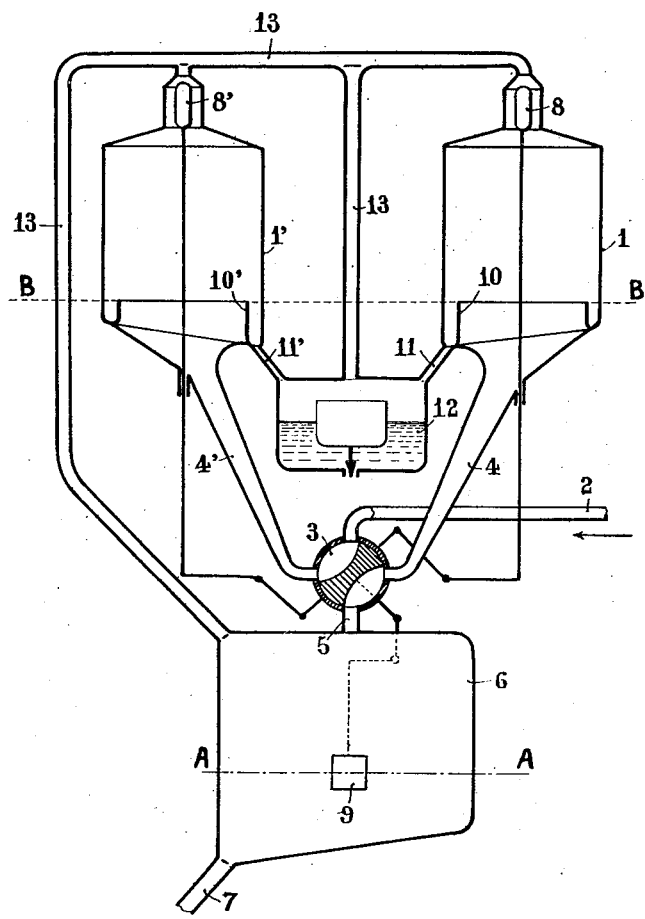
Figure 2:
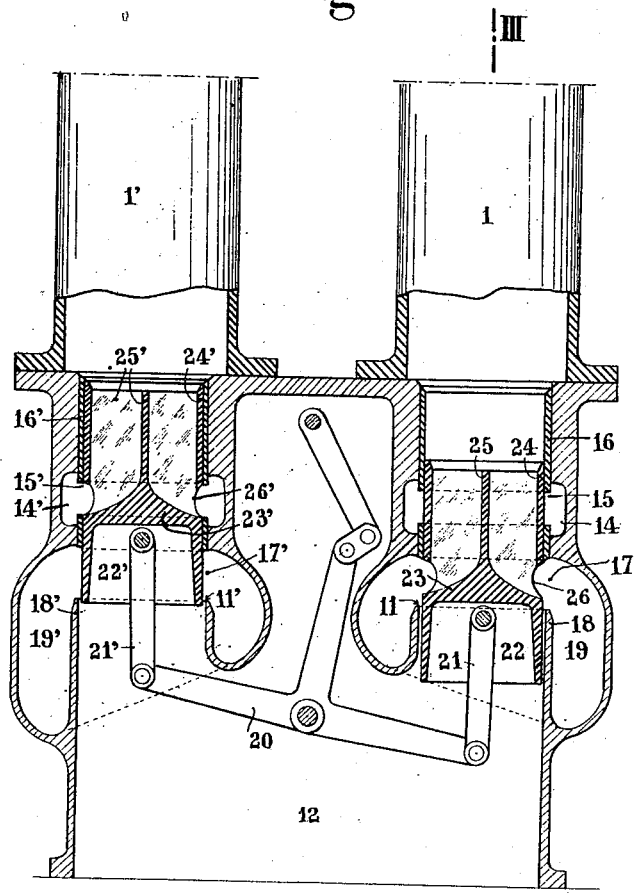
Fig. 2 shows an embodiment, by way of example, in partial vertical section.

The double-gauge distributor illustrated in Fig. 1, comprises two gaugers 1, 1', filling up through the bottom, from a pump, not shown, by means of the conduit 2, the reversing system 3 and the pipe-lines 4 and 4'; they also empty through the bottom, by means of the pipe-lines 4 and 4', the reversing system 3 and the conduit 5 into the intermediate chamber 6 connected by 7 to the flexible distributing pipe. Each of the gaugers comprises at the upper part thereof a float 8, 8' controlling the tripping of the reversing system 3 as soon as the gauger being filled up is exactly filled. The intermediate chamber 6 comprises a float 9 locking the reversing system 3 as soon as the liquid to be distributed reaches a level A—A in the intermediate chamber, such that above said level there remains a space available in the intermediate chamber at least equal to the capacity of one of the gaugers 1 and 1'. At the lower part of each gauger is provided a channel 10, 10' collecting the draining, limited at its upper part at the level B—B and connected by conduits 11, 11' evacuating the draining to the blow-off vat 12; said blow-off vat communicates at the upper part thereof through conduits 13 with the upper part of the gaugers 1, 1' and of the intermediate chamber 6.

The operation will be easily understood:

As long as the pump operates and the liquid to be distributed does not reach the level A—A in the intermediate chamber, the reversing system, controlled by the floats 8, 8', alternately ensures the filling up of one of the gaugers by means of the pump and the emptying of the second gauger into the intermediate chamber; the time required for emptying the gauger is constant, and, therefore, the loss of liquid through conduits 11, 11', which ceases as soon as the liquid in the gauger is at a level lower than level B—B, is also constant; the draining of the walls of the gauger takes place through conduits 11, 11', into the blow-off vat 12 and is therefore eliminated from the distribution; when the viscosity of the liquid to be measured increases, the quantity which flows through the orifices 11, 11', chosen sufficiently small, diminishes while the gauger is emptying, but, on the contrary, the quantity of draining liquid remaining on the walls, after the gauger has emptied, is increased, this ensuring automatic compensation.

Furthermore, if the level in the intermediate chamber 6 rises above the level A—A, the float 9 locks the reversing system 3; in this way, the gauger can begin to empty only if there remains in chamber 6 a free space sufficient for it to completely empty therein, without anything diminishing the time which is necessary for it to empty.

In order that said distributor should be of real practical advantage, it is necessary that the emptying speed of each gauger should be very high, so as to allow a pumping speed ensuring a sufficiently great outflow of the pump; in order that it should be accurate, there must not be, between the device collecting the draining and the reversing system, surfaces the draining of which can more or less completely flow with the distribution, according to the pumping speed, as the surfaces of pipe-lines 4 and 4' of the diagram shown in Fig. 1. This is the result obtained by the embodiment shown in Figs. 2 to 5, in which, on the one hand, the reversing system, which can be automatic or manual, comprises a piston sliding in each gauger, successively covering and uncovering the filling up and emptying ports provided in the lateral wall of the gauger; said ports are preferably arranged at different levels, so that each of them can occupy all the periphery of the piston and have the maximum cross section for a given stroke of the piston. On the other hand, the bottom of the piston is curved so as to ensure the progressivity of the sections of flow and avoid any sudden variation of section capable of creating the beginning of turbulence or separation of the stream, which curve, for greater simplicity, will be called hereinafter "in the form of the stream line." Finally the device collecting draining is located below the reversing system, but preferably as near of the reversing system as possible, for instance before the emptying ports.

Figure 3:
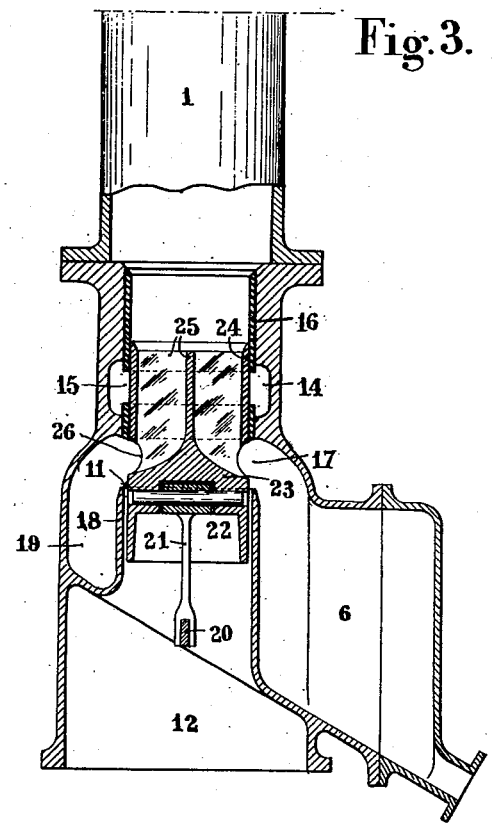
Fig. 3 is a view in vertical section made according to line III—III of Fig. 2.
Figure 4:
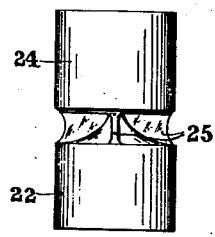
Figs. 4 and 5 are views respectively in elevation and in plan of a piston of the distributor.
Figure 5:
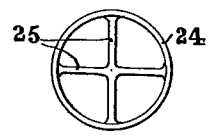

The filling up of gaugers 1 and 1' by the pump, not shown, takes place through annular channels 14, 14' and ports 15, 15' provided in the walls 16, 16' of the gaugers. They are emptied through ports 17, 17' provided in an extension 18, 18' of the walls of the gaugers, and annular channels 19, 19' which only comprise surfaces joining without any sudden variation of section or direction and which constitute the upper part of the intermediate chamber 6 (Fig. 3).

The automatic or manual reversing system comprises a beam 20 the ends of which are connected by connecting-rods 21, 21' to the pistons 22, 22' the bottom 23, 23' of which is a surface of revolution having a generatrix in the form of a stream line; each piston is provided at the upper part thereof with a cylindrical surface 24, 24' of the same diameter, which is secured by means of four vertical vanes 25, 25' serving moreover to guide the liquid; said cylindrical surface 24, 24' is arranged at a certain height above the piston 22, 22' so as to leave an interval 26, 26' used for alternately uncovering the supply ports 15, 15' and evacuation ports 17, 17' according as the piston is in the upper or lower position.

Draining annular conduits 11 and 11', constituted by the clearance provided between the skirt of pistons 22, 22' and the extensions 18, 18' of the lateral wall of gaugers 1, 1', evacuate to the blow-off vat 12 the draining from the surfaces of gaugers 1.

As will be seen in the drawing, the cylindrical surface 24 of the piston covers the filling up port 15 and gauger 1 empties, through the interval 26 and port 17, into conduit 19; during said emptying, which is very rapid owing to the stream line form of the bottom 23 of piston 22, the quantity of liquid withdrawn from the distribution through the draining conduits 11 is reduced to the minimum, and this, so much the more, as the edge of the bottom of the piston is at a level slightly higher than that of the lower part of port 17. As soon as the emptying is finished, the draining is collected by said draining conduit 11. During this time the gauger 1' fills up, the liquid arriving through channel 14', port 15' and interval 26'. Once the gauger 1' is filled up, the reversing system 3 operates, piston 22' descends to the lower position and piston 22 rises to the upper position; gauger 1' empties and gauger 1 fills up, and so on.

It is to be noted that if a leakage is produced around the wall 24 or 24' of the gauger being filled up, during a stopping period of the distributor, the leakage will be collected in the annular draining conduits 11 and 11' and, consequently, withdrawn from the distribution.

It is to be understood that, although the invention has been described with reference to a double-gauge distributor, it can be used with a single or multi-gauge distributor; numerous modifications can be made in the device described, simply by way of indicating example and not in a limiting sense, without departing thereby from the scope of the present invention.

What I claim as my invention and desire to secure by Letters Patent is:

A gauging distributor for liquid comprising at least one gauging vessel, an intermediate chamber intended to receive the gauged liquid discharged from the gauging vessel, a cylindrical conduit extending downwardly from the bottom of said gauging vessel and provided with inlet ports, means forming an annular channel surrounding said cylindrical conduit and communicating therewith through said inlet ports and connected to an inlet for the liquid, means forming a second annular channel located below said conduit in the upper portion of said intermediate chamber, an inner wall of said second annular channel being below the lower part of the conduit and separated therefrom by a circular space through which the liquid may flow from the gauging vessel and said conduit into said channel, a piston sliding with some clearance through the inner wall of said second channel and with slight frictional contact in the lower part of the cylindrical conduit, the top of said piston being formed with a surface having a slope decreasing gradually from the center to the peripheral edge thereof, a cylindrical ring supported by said piston and sliding with a slight frictional contact in said cylindrical conduit, said cylindrical ring being provided in its lower portion with an opening permitting the liquid admitted in said first annular channel to fill up said gauging vessel through the inlet ports of said cylindrical conduit and said opening when said piston is moved upwards and to flow through said opening and circular space into said second annular channel and into said intermediate chamber when the piston is moved downwards, whereby the liquid drained from the walls of said gauging vessel through said conduit and said ring can seep through the clearance left between said inner wall of said second channel and said piston when said piston is moved downwards.

JEAN GUSTAVE ANTOINE
MARIE JOSEPH MEYER.

REFERENCES CITED

The following references are of record in the file of this patent:

UNITED STATES PATENTS

| Number | Name | Date |
|---|---|---|
| 494,467 | Donathen | Mar. 28, 1893 |
| 1,393,421 | Baker | Oct. 11, 1921 |
| 1,665,093 | Gouvion | Apr. 3, 1928 |
| 1,743,745 | Wydler | Jan. 14, 1930 |
| 1,808,734 | Carbonaro | June 2, 1931 |
| 1,846,852 | Dubreuil | Feb. 23, 1932 |
| 1,883,762 | Carbonaro | Oct. 18, 1932 |

FOREIGN PATENTS

| Number | Country | Date |
|---|---|---|
| 275,153 | Great Britain | Oct. 20, 1927 |
| 242,376 | Switzerland | Oct. 16, 1946 |